United States Patent [19]

Grant et al.

[11] Patent Number: 5,275,739

[45] Date of Patent: Jan. 4, 1994

[54] IN-SITU RESTORATION OF CONTAMINATED SOILS AND GROUNDWATER USING CALCIUM CHLORIDE

[75] Inventors: David C. Grant, Gibsonia, Pa.; Carmine M. Mancuso, Aiken, S.C.; Herbert A. Burgman, Murrysville Boro, Pa.

[73] Assignee: Westinghouse Electric Corp., Pittsburgh, Pa.

[21] Appl. No.: 870,439

[22] Filed: Apr. 16, 1992

[51] Int. Cl.$^5$ .............................................. B01D 15/00
[52] U.S. Cl. .................................... 210/682; 210/688; 210/170
[58] Field of Search ............... 210/751, 634, 724, 726, 210/682, 912, 913, 611, 747, 766, 765, 170, 688; 405/263, 128, 129

[56] References Cited

U.S. PATENT DOCUMENTS

| | | | |
|---|---|---|---|
| 3,950,179 | 4/1976 | Schneider | 106/208 |
| 4,156,658 | 5/1979 | Mercer, Jr. et al. | 252/301.1 W |
| 4,336,142 | 6/1982 | Bye | 210/724 |
| 4,354,942 | 10/1982 | Kaczur et al. | 210/712 |
| 4,418,961 | 12/1983 | Strom et al. | 299/5 |
| 4,615,643 | 10/1986 | Gouvenot | 405/128 |
| 4,888,053 | 12/1989 | Grayson et al. | 75/101 R |
| 4,909,849 | 3/1990 | Funderburk | 106/90 |
| 4,950,409 | 8/1990 | Stanforth | 210/751 |
| 4,981,394 | 1/1991 | McLaren et al. | 405/129 |
| 4,997,313 | 3/1991 | Gibson et al. | 405/128 |
| 5,013,453 | 5/1991 | Walker | 210/712 |

OTHER PUBLICATIONS

Handbook on In Situ Treatment of Hazardous Waste Contaminated Soils, EPA/540/2-90/002, Jan. 1990.

*Primary Examiner*—Frank Spear

[57] ABSTRACT

A method for stabilizing in-situ soluble heavy metal contaminants in carbonate-containing land or submarine formations which comprises introducing into the carbonate-containing formation an aqueous solution of calcium chloride, wherein the solution contains a stabilizing amount of calcium ions. The contaminants and the carbonate form coprecipitates with the calcium ions which are insoluble in formation fluids, therefore substantially inhibiting the remobilization of the heavy metals with groundwater. The method is effective with heavy metals which exist in both anionic and cationic form in carbonate-containing land or submarine formations. The method may be used to treat land formations hundreds of feet below the surface, landfill deposits, or submarine formations to reduce soluble heavy metal contaminants to a few parts per million.

20 Claims, No Drawings

IN-SITU RESTORATION OF CONTAMINATED SOILS AND GROUNDWATER USING CALCIUM CHLORIDE

CROSS REFERENCE TO RELATED APPLICATION

The invention described herein is related to copending application Ser. No. 870,444 filed concurrently herewith, entitled "In-Situ Restoration of Contaminated Soils and Groundwater using Calcium Chloride" by Grant et al. and assigned to the assignee of the present application.

BACKGROUND OF THE INVENTION

This invention relates generally to methods of restoring contaminated soils and groundwater in-situ using calcium chloride, and, more particularly, to a method for stabilizing soluble heavy metal contaminants in carbonate-containing land or submarine formations using aqueous solutions of calcium chloride to prevent the remobilization of these heavy metal contaminants by groundwater.

There is increasing concern over the hazards posed by the rising levels of heavy metals within the world's water supplies and land formations due to accidental spills, leaks, mining practices and poor disposal practices. Most heavy metals are toxic to some degree to all life-forms, and can have a deleterious effect on aquatic flora and fauna. In humans, toxic heavy metal poisoning can lead to severe nervous system disorders and can cause death.

Accordingly, numerous methods for the removal of heavy metals from land and submarine formations have been proposed. For example, contaminated water or soil could be removed from its location and subsequently treated offsite. However, this method is not only extremely time-consuming and costly, it presents added dangers associated with the transportation of such hazardous materials. In addition, it may not be feasible or practical from a cost standpoint to remove an entire contaminated area for treatment. Thus, significant amounts of contamination may remain even after application of such treatment methods.

Alternatively, it has been suggested that heavy metals situated in ground-water or soil can be mobilized and removed via solubilization techniques, wherein the effluent is subsequently pumped above ground, removed and treated. Again, such methods are typically very time-consuming and costly. In addition, this approach can potentially lead to undesirable further spread of the contamination.

It has further been suggested that heavy-metal-containing-soils can be treated in-situ by various precipitation techniques. For example, in U.S. Pat. No. 4,354,942, issued to Kaczur et al., a method for the in-situ removal of soluble mercury from land and water areas using sulfur compounds is described. However, the use of sulfur compounds presents potential safety and health problems in itself.

The use of various calcium-containing-compositions to treat heavy metals in ground-water and/or soil is also known. However, there are significant disadvantages associated with the application of each of these methods. For example, in U.S. Pat. No. 4,950,409, issued to Stanforth, there is disclosed a method for treating hazardous waste-containing soil using calcium carbonate in the form of limestone. In Stanforth's method the soil must be intimately mixed with the limestone in order to render the soil nonhazardous. Accordingly, Stanforth's method is not intended to be utilized in-situ, especially underground, where such mixing would not be feasible. Moreover, the addition of limestone underground would cause premature plugging once the solution was added, thereby preventing the entire contaminated area from being treated.

In U.S. Pat. No. 4,981,394, issued to McLaren et al., a method of inducing carbonate cementation or precipitation of calcite as a sealant in soils, sediment, bedrock, and other alkaline materials is disclosed. In this method, solid particles of calcium chloride with limestone fines are plowed into the surface of the solid waste landfill, which is then wetted down with solution. These components react to produce crystals of calcium carbonate which cement soil particles together and fill void space to reduce porosity and permeability. This method results in severe plugging of the flow path for the area being treated, and thus, prevents the entire contaminated area from being treated. In addition, this method merely prevents further migration of the contaminants instead of achieving the more desirable stabilization of them.

In U.S. Pat. No. 4,418,961, issued to Strom et al., there is disclosed an in-situ method for restoring soluble heavy metal contaminants in subterranean formations that have been subjected to uranium mining. Strom et al. teach to add restoration fluid containing small amounts of $CO_2$ to a mining site containing calcium carbonate in order to induce precipitation of calcium with the heavy metal ions, and thereby stabilize the heavy metal contaminants. Alternatively, Strom et al. disclose that if the site does not contain calcium carbonate therein, or if the reaction with $CO_2$ is not sufficient to reduce contaminants to acceptable levels, restoration may be achieved by injecting an aqueous solution of calcium chloride.

Strom's method is limited to removal of metal anions. Moreover, this method essentially limits the amount of calcium ion to be added to concentrations dictated by the solubility product of the calcium/heavy metal precipitate, which is a relatively minor amount. Accordingly, the method is slow, inefficient, and highly ineffective in reducing the level of contaminates to environmentally acceptable levels. As a result, groundwater in formations treated with Strom's restoration methods is likely to be re-contaminated with unacceptably high levels of heavy metal contaminants several weeks after treatment.

SUMMARY OF THE INVENTION

The present invention is directed to a method for stabilizing in-situ soluble heavy metal contaminants in carbonate-containing land or submarine formations. The method of the invention comprises introducing into a carbonate-containing formation an aqueous solution of calcium chloride that contains a stabilizing amount of calcium ions; upon introduction of the solution, the calcium ions coprecipitate with the carbonate ions and the heavy metal contaminants. The coprecipitates are insoluble in formation fluids, including groundwater.

In practicing the method of the invention, calcium chloride is introduced into the formation as a solution having a desirably high concentration of calcium ions. In one preferred embodiment of the invention, the solution is introduced into a formation that contains carbonate, preferably in the form of carbonate ions. Due to the introduction of a substantial amount of calcium in a highly soluble form, the concentrations of calcium and carbonate typically substantially exceed the concentration of heavy metal ions in the formation. Therefore, upon injection, the calcium ions readily coprecipitate with the carbonate ions and the metal ions, entrapping the metal ions therein and thereby stabilizing them. Thus, the coprecipitation reaction acts as a scavenger for the heavy metal ions.

Accordingly, the method is extremely quick and effective at stabilizing heavy metal anions and cations, and reducing their amounts to environmentally acceptable levels. Moreover, the method of the invention avoids undesirable premature plugging of the flow path. Instead, the entire contaminated zone can be subjected to a controlled precipitation reaction and, thus, can be readily treated.

The method of the invention is effective at stabilizing a wide variety of soluble heavy metals which can be eluted or leached out of land formations by rainfall or ground water, and which can subsequently enter public or private water supplies, thus posing significant danger to the environment. In particular, the method is very effective at removing heavy metal contaminants from ground water and stabilizing them in the soil. Furthermore, the heavy metal contaminants are not remobilized when fresh groundwater comes into contact with the restored (i.e., treated) soil.

In another embodiment of the invention, the method of the invention may be applied to formations that do not naturally contain carbonate or a source of carbonate ions therein. In this embodiment, in addition to an aqueous solution of calcium chloride, carbon dioxide is introduced into the formation in order to form carbonate ionic species therein. Consequently, the same coprecipitation reaction occurs in the formation; calcium ions coprecipitate with carbonate and heavy metal ions, entrapping the metal ions, and forming a coprecipitate which is insoluble in formation fluids.

Accordingly, it is an object of this invention to provide an in-situ method for stabilizing soluble heavy metal contaminants in carbonate-containing land or submarine formations which minimizes the potential for the re-contamination of groundwater, and further, which can be utilized without posing safety and health problems to workers, and without harmful impact to the environment.

It is a further object of this invention to provide a method for the in-situ stabilization of soluble heavy metal contaminants which is fast, efficient and highly effective in reducing the level of contaminates to environmentally acceptable levels.

DETAILED DESCRIPTION OF THE INVENTION

In the method of the invention, an aqueous solution of calcium chloride is introduced into a carbonate-containing land or submarine formation which is contaminated with soluble heavy metals. The soluble heavy metal contaminants are caused to coprecipitate with calcium ions and carbonate ions. The coprecipitates so formed are substantially insoluble in formation fluids. Being insoluble, the coprecipitates drop out of solution and onto the soil, thereby substantially removing the heavy metals from solution. In addition, the coprecipitation reaction substantially stabilizes the heavy metal contaminants, that is, it inhibits further remobilization, elution and leaching of the contaminants by groundwater.

"Coprecipitation" as used with respect to the invention described herein refers to the chemical phenomenon where, within an aqueous solution containing a cationic precipitate precursor, an anionic precipitate precursor, and one or more coprecipitant precursors, the cationic and anionic precipitate precursors are caused to chemically react and precipitate out of the aqueous solution as precipitate particles; and, as the precipitate particles are formed, coprecipitant precursors are removed from the aqueous solution by adsorption onto the surface of the precipitate and/or by occlusion within the interior of the precipitate. The term "occlusion" as used herein refers to the entrapment of foreign ions within a precipitate by physical encapsulation within the precipitate walls and/or by chemical bonding within the precipitate structure.

In the method of the invention, the cationic precipitate precursor (calcium ions) are caused to react with the anionic precipitate precursor (carbonate ions) and precipitate out of solution. As the precipitate forms, substantial quantities of coprecipitant precursors (heavy metal ions) coprecipitate with the precipitate and are thereby removed from solution.

The method of the invention can be used to remove soluble heavy metals from nearly any land or submarine formation. Thus, the method of the invention can be used in land or aqueous formations that exist above ground, as well as those found several hundred feet below ground. In addition, it is possible to treat proximate, or preferably adjacent, land and aqueous formations simultaneously.

The method of the invention is particularly useful in restoring land and submarine formations after in-situ leaching of soil to recover uranium. However, it should be understood that the method can be applied to any formation containing an unacceptably high level of soluble heavy metal contaminants. Soluble heavy metal contaminants include ionic heavy metals, dissolved heavy metals and other forms of water soluble heavy metals. Preferably treated by the method of the present invention are heavy metal containing materials containing ionic heavy metal or dissolved heavy metal species.

In addition to uranium, the invention is particularly useful in removing heavy metals including but not limited to arsenic, cesium, copper, cobalt, lead, iron, strontium, radium, silver, cadmium, mercury, chromium, barium, zinc, thorium and any mixture thereof.

Carbonate containing materials are a common constituent in many soils, and in practicing the method of the invention it is desirable that the land or submarine formation being treated naturally contain carbonate or carbonate-containing material therein. The carbonate can be present in the formation as a solid in salt or mineral form, or preferably, it is dissolved and exists as an ionic species.

In practicing the invention, an aqueous calcium chloride solution containing a stabilizing amount of calcium ion is introduced into the carbonate-containing formation. By "stabilizing amount of calcium ion" is meant that enough calcium-ion-containing solution has been added to the formation to reduce the level of a heavy metal contaminant in the formation to at least about 1000 parts per million ("ppm"), preferably to at least about 100 ppm, more preferably to about 5 to 10 ppm, and even more preferably to at least about 1 ppm.

In order to attain this level of heavy metal stabilization, it is preferred that in practicing the invention calcium chloride is introduced into the formation as an aqueous solution having a desirably high concentration of calcium ions. For example, in practicing the method of the invention, an aqueous solution of calcium chloride containing at least about 0.1 to about 20 gm/liter of calcium chloride may be introduced into the formation. Preferably, the aqueous solution should contain about 0.1 to about 15 gm/liter, more preferably about 1 to about 10 gm/liter, even more preferably about 1 to about 5 gm/liter, and most preferably about 2 to about 3 gm/liter of $CaCl_2$. The term "aqueous solution" as used herein is meant to include solutions in which the solvent is typically water and optionally, water-miscible liquids.

Therefore, in practicing one preferred embodiment of the invention, a substantial amount of calcium, in a highly soluble form, is introduced into a formation that naturally contains carbonate. The concentrations of calcium and carbonate in the formation are typically much greater than the concentration of heavy metal contaminants. Thus, the calcium ions readily react with the carbonate ions, thereby precipitating out of solution. As the precipitate forms, substantial quantities of heavy metal ions coprecipitate with the calcium carbonate precipitate and are removed from solution.

Alternatively, in those formations that do not contain any carbonate materials naturally therein, or that contain insufficient amounts, in order to practice the invention it is necessary to provide soluble carbonate to the formation. This may be achieved by introducing carbon dioxide gas into the formation. $CO_2$ and $CaCl_2$ solution can be simultaneously introduced. Alternatively, $CaCl_2$ solution and $CO_2$ gas can be introduced sequentially, preferably introducing calcium chloride solution into the formation first.

The coprecipitation reaction is very rapid. Typically, more than about 90 weight %, and usually more that about 99 weight %, of the heavy metals coprecipitate within about 15 minutes after introduction of the solution into the formation. After this period, the remaining solubilized heavy metals continue to be adsorbed or occluded to the coprecipitate particles. Typically, the coprecipitation reaction will be substantially complete in about 60 minutes. Generally, increasing the amount of carbonate in the formation, or increasing the pH of the soil, will increase the coprecipitation reaction rate.

While any land or submarine formation having a pH greater than about 4 may be treated using the novel methods of the present invention, it is preferable to treat formations that have a pH of greater than about 5, and preferably between about 6 to about 9. A higher soil pH tends to lead to the formation of coprecipitates of heavy metals with calcium hydroxide. Generally, such calcium hydroxide coprecipitates are undesirable because they form prematurely, thereby resulting in field plugging.

The present invention may be carried out utilizing any suitable means for introducing $CaCl_2$ solution and $CO_2$ into the formation. For example, injection systems as defined by any suitable arrangement of wells may be used. The injection wells can be arranged in any convenient pattern such as the conventional five spot pattern wherein a central well is surrounded by four somewhat symmetrically located injection wells. Alternatively, other suitable patterns include line drive, staggered line drive, four spot, seven spot, and others.

The restoration method may be carried out by injecting at least one pore volume of calcium chloride solution into the formation (accompanied or followed by carbon dioxide, if necessary). The solution is allowed to sit and react. After a period of time has passed, clean water is subsequently injected and recovered after it has passed through the contaminated zone. The level of soluble contaminants in the formation is monitored by analyzing the recovered solution for the presence of the heavy metals. If necessary, additional pore volumes of calcium chloride are injected into the formation.

The determination of the attainment of environmentally acceptable levels of contaminants may be preformed by any suitable analytical procedure, such as atomic absorption spectroscopy, emissions spectroscopy and the like.

By practicing the method of the invention, levels of contamination may be reduced to environmentally acceptable values, typically less than about 10 ppm, preferably less than about 5 ppm, and even more preferably less than about 1 ppm.

Introduction of calcium chloride may cease when the recovered solution contains acceptable levels of contamination. However, in order to ensure that stabilization of the contaminants in the treated area is substantially complete, it has been determined that it is preferable to continue to apply the method even after environmentally acceptable contamination levels are initially attained. For example, at least one more pore volume of aqueous solution containing calcium chloride can be introduced into the formation and allowed to sit and react. This will ensure that an environmentally acceptable level of contaminant will be maintained for a prolonged period following treatment. For example, environmentally acceptable levels of contamination were attained by the present method of the invention six months after treatment and restoration.

In another embodiment of the method of the invention, the solution can be recovered after it has passed through the contaminated zone, the recovered solution can be substantially purified of heavy metal contaminants contained therein, the purified solution can be reconcentrated with calcium chloride solution, and reinjected into a carbonate-containing formation.

The invention is further illustrated by the following examples which are not intended to be limiting.

EXAMPLES

The operability of this invention has been demonstrated in pilot-scale tests conducted at a uranium mining site. Four 2-spot well-field patterns were tested. The well-fields previously had been mined using ammonium bicarbonate solution. Thus, each 2-spot contained groundwater and soil contaminated with ammonium and uranium.

In two of the 2-spots, hydrogen sulfide was used to reduce the amount of uranium contamination underground. It previously had been reported that hydrogen sulfide was effective at stabilizing uranium ions by reducing soluble uranium to an insoluble state such as $U(+4)$.

In the other two 2-spots, calcium chloride was used in accordance with the method of the present invention to reduce the amount of uranium to acceptable levels. Calcium chloride solution was injected into one well and recovered in the other.

The results of these tests are summarized in Table I.

TABLE 1

EFFECT OF RESTORATION SOLUTION ON URANIUM GROUNDWATER LEVELS

| 5-Spot | Restoration Solution | Pre-Restoration Uranium Level | Post-Restoration Uranium Level | Stable* Uranium Level |
|---|---|---|---|---|
| A | 170-340 ppm $H_2S$ | 18 ppm | 5 ppm | 11 ppm |
| B | 1 gm/L $CaCl_2$ | 8 ppm | 2.5 ppm | <2 ppm |
| C | 170-340 ppm $H_2S$ | 14 ppm | 5 ppm | 11 ppm |
| D | 2.8 gm/L $CaCl_2$ | 8 ppm | 2 ppm | 3 ppm |

*Level 6 months after restoration

Results show that while hydrogen sulfide was effective at initially reducing uranium contamination from 14-18 ppm to 5 ppm, the uranium level achieved was not stable. Instead, the uranium level increased to 11 ppm six months after treatment. Thus, soluble uranium contaminants remained in the soil which had not been stabilized, and these ions continued to re-contaminate the groundwater.

In comparison, the 2-spots treated with calcium chloride in accordance with the method of the present invention achieved lower uranium levels during restoration (that is, <2-3 ppm), and these levels were maintained for at least six months after treatment. Thus, the injection of calcium chloride initially lowered the uranium levels in the groundwater, and further, prevented any further mobilization of uranium from the soil into the groundwater.

This in-situ restoration method can be applied to any number of contaminated sites, including for example, radioactive waste or chemical waste burial sites. It is very cost effective and technically superior to other in-situ methods presently available.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method for stabilizing in-situ soluble, heavy metal, anionic and/or cationic contaminants in carbonate-containing land or submarine formations which comprises the steps of:
   introducing into the carbonate-containing formation an aqueous solution of calcium chloride, said solution containing a stabilizing amount of calcium ions;
wherein the contaminants and the carbonate when subjected to calcium ions form coprecipitates which are substantially insoluble in formation fluids, thereby inhibiting the remobilization of said heavy metal contaminants by groundwater.

2. The method of claim 1 further comprising the steps of:
   a) monitoring the level of contaminants in the formation fluids;
   b) continuing the introduction of calcium chloride after the concentration of the contaminants in the formation fluids reaches environmentally acceptable levels.

3. The method of claim 1 wherein the contaminants are selected from the group consisting of uranium, cesium, copper, arsenic, cobalt lead, iron, strontium, radium, silver, cadmium, mercury, chromium, barium, zinc, thorium and mixtures thereof.

4. The method of claim 1 wherein said aqueous solution of calcium chloride contains at least about 0.1 gm/liter to about 15 gm/liter of calcium chloride.

5. The method of claim 4 wherein said aqueous solution of calcium chloride contains at least about 1 gm/liter to about 10 gm/liter of calcium chloride.

6. The method of claim 5 wherein said aqueous solution contains about 2 to about 3 gm/liter of calcium chloride.

7. The method of claim 1 as applied after the in-situ leaching of soil to recover uranium.

8. The method of claim 1 wherein the calcium chloride solution is introduced by injecting it into said carbonate-containing land or submarine formation.

9. The method of claim 1 wherein the pH of the solution is greater than about 4.

10. The method of claim 1 further comprising the steps of:
    a) recovering said injected solution from said formation after said coprecipitation reaction occurs;
    b) purifying said solution;
    c) reconcentrating said purified solution with calcium chloride; and
    d) reinjecting said solution into a carbonate-containing land or submarine formation.

11. A method for stabilizing in-situ soluble, heavy metal, anionic and/or cationic contaminants in land or submarine formations that lack carbonate, said method comprising the steps of:
    a) introducing into the formation an aqueous solution of calcium chloride, said solution containing a stabilizing amount of calcium ions; and
    b) introducing carbon dioxide into the formation;
wherein said contaminants when subjected to calcium ions and carbonate form coprecipitates which are substantially insoluble in formation fluids, thereby inhibiting the remobilization of said heavy metal contaminants by groundwater.

12. The method of claim 11 further comprising the steps of:
    a) monitoring the level of contaminants in the formation fluids;
    b) continuing the introduction of calcium chloride and carbon dioxide after the concentration of the contaminants in the formation fluids reaches environmentally acceptable levels.

13. The method of claim 11 wherein the contaminants are selected from the group consisting of uranium, cesium, copper, arsenic, cobalt, lead, iron, strontium, radium, silver, cadmium, mercury, chromium, barium, zinc,, thorium and mixtures thereof.

14. The method of claim 11 wherein said aqueous solution of calcium chloride contains about at least about 0.1 gm/liter to about 15 gm/liter of calcium chloride.

15. The method of claim 14 wherein said aqueous solution of calcium chloride contains about at least about 1 gm/liter to about 10 gm/liter of calcium chloride.

16. The method of claim 15 wherein said aqueous solution contains about 2 to about 3 gm/liter of calcium chloride.

17. The method of claim 12 wherein said carbon dioxide and calcium chloride solution are introduced into said formation by injection.

18. The method of claim 11 wherein the pH of the aqueous solution is greater than about 5.

19. The method of claim 11 wherein steps (a) and (b) are done sequentially, with step (a) being done first.

20. A method for stabilizing in-situ soluble, heavy metal, anionic and/or cationic contaminants in land or submarine formations that contain little or no carbonate, said method comprising the steps of:
   a) first introducing into the formation an aqueous solution of calcium chloride containing about 1 to about 5 gm/liter of calcium chloride; and
   b) then introducing carbon dioxide into the formation;

wherein said contaminants when subjected to calcium ions and carbonate form coprecipitates which are substantially insoluble in formation fluids, thereby inhibiting the remobilization of said heavy metal contaminants by groundwater.

* * * * *